United States Patent [19]

Fresh

[11] Patent Number: 5,097,758

[45] Date of Patent: Mar. 24, 1992

[54] FRUIT AND VEGETABLE PEELER

[76] Inventor: Elwyn M. Fresh, 19 Buckingham Dr., Bella Vista, Ark. 72714

[21] Appl. No.: 516,051

[22] Filed: Apr. 27, 1990

[51] Int. Cl.$^5$ .......................... A23N 7/00; A47J 17/16
[52] U.S. Cl. ......................................... 99/590; 99/591; 99/593; 99/595; 99/598; 99/623; 241/169
[58] Field of Search ................. 99/540, 541, 584, 587, 99/588, 590, 591, 593, 594–599, 623; 241/169; 51/154, 205 R, 392

[56] References Cited

U.S. PATENT DOCUMENTS

| 110,322 | 12/1870 | Woodbury . | |
|---|---|---|---|
| 759,264 | 5/1904 | Glasser | 99/591 |
| 879,417 | 2/1908 | Segelcke . | |
| 1,001,931 | 8/1911 | Cookson . | |
| 1,451,342 | 4/1923 | Mendez | 99/596 |
| 1,604,347 | 10/1926 | Guerrieri | 99/596 |
| 2,182,688 | 12/1939 | Buchhagen | 99/595 |
| 2,266,278 | 12/1941 | Senkewitz | 99/588 |
| 2,299,761 | 10/1942 | McCauley | 99/591 |
| 2,831,517 | 4/1958 | Pouzoulet . | |
| 2,986,346 | 5/1961 | Rozmus | 241/169 |
| 3,112,779 | 12/1963 | Roberts . | |
| 3,874,259 | 4/1975 | Chambos et al. | 99/538 |
| 4,430,931 | 2/1984 | Hsu . | |
| 4,581,990 | 4/1986 | Matsumoto | 99/594 |
| 4,628,808 | 12/1986 | Simon | 99/538 |
| 4,753,159 | 6/1988 | Eaton | 99/596 |

FOREIGN PATENT DOCUMENTS

| 2249314 | 4/1974 | Fed. Rep. of Germany | 241/169 |
|---|---|---|---|
| 1212429 | 3/1960 | France | 99/595 |

Primary Examiner—Timothy F. Simone
Attorney, Agent, or Firm—Litman, McMahon & Brown

[57] ABSTRACT

A fruit and vegetable peeler includes a tong assembly with flexible grater plates resiliently connected across spaced apart joints of the assembly. The tong assembly is mounted on a support plate in sliding guides which confine the motion of members of the tong assembly. A food article receiving aperture is formed through the support plate, and the grater plates are positioned for access through the aperture. The support plate is placed on a collection container on a platform having a motor guide standard upstanding therefrom. A rotary motor is connected to a guide bracket which is slidable on the standard. The motor has a pronged chuck which engages a food article, such as a carrot, to spin same when the motor is activated. The spinning food article is lowered between the grater plates and the tong handles closed to abrasively engage the grater plates with the food article to remove a surface layer thereof.

15 Claims, 2 Drawing Sheets

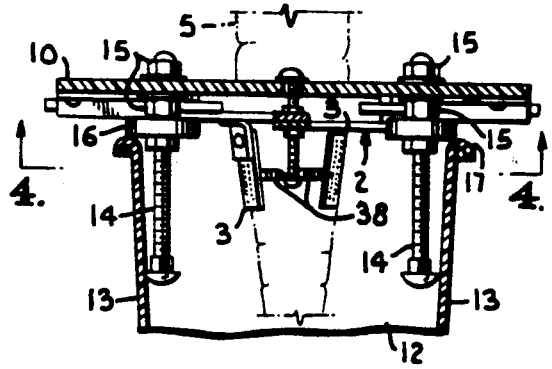
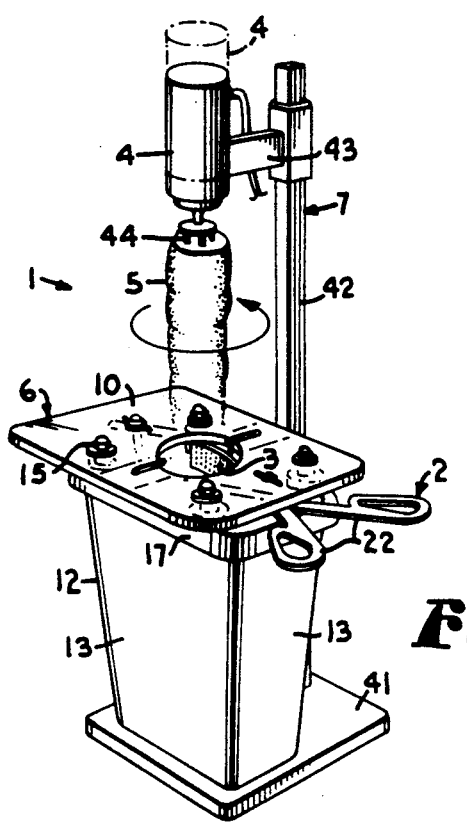
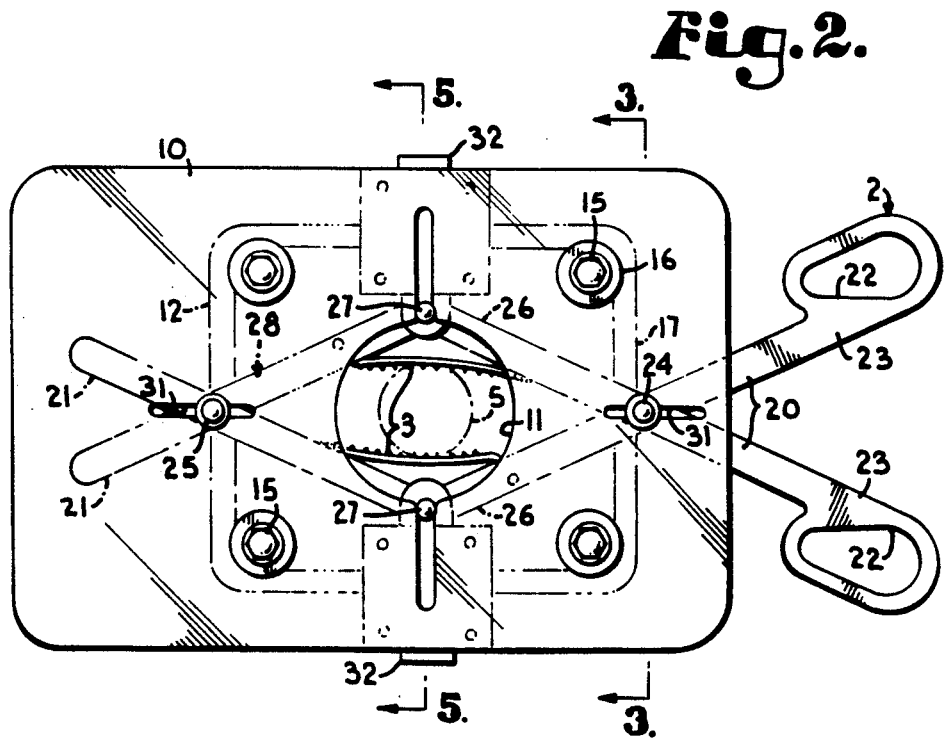

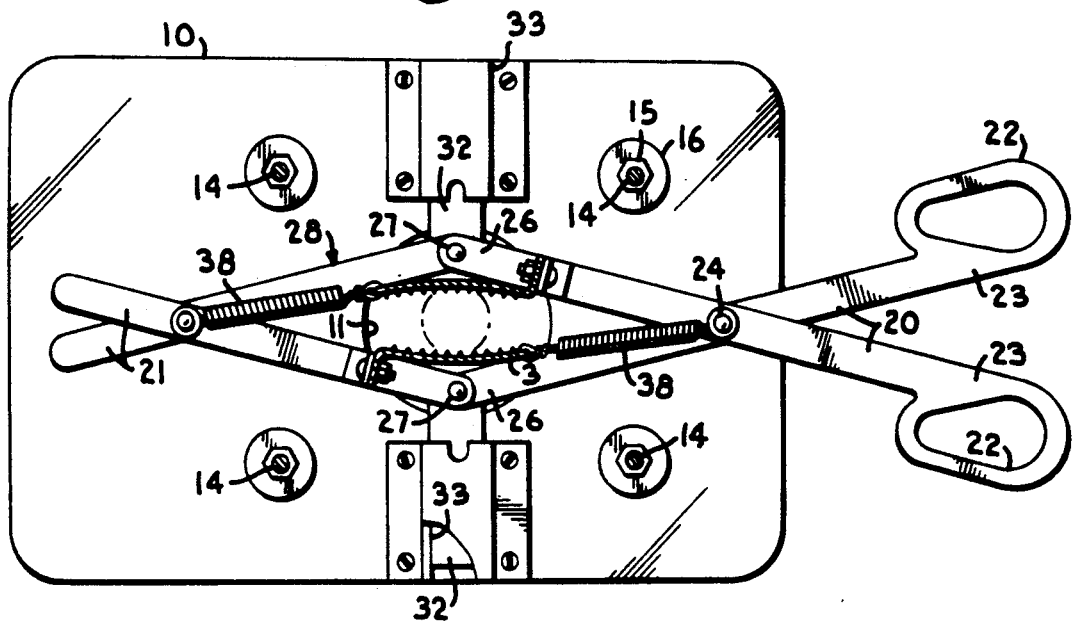
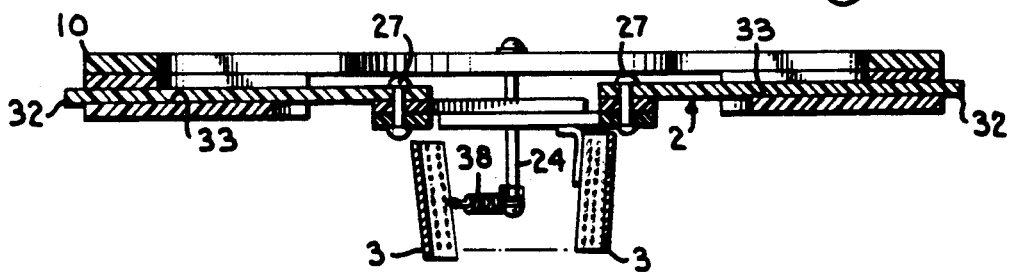
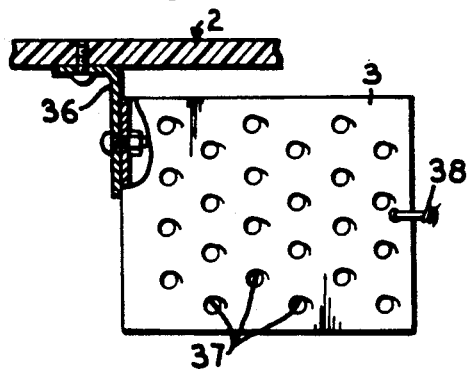
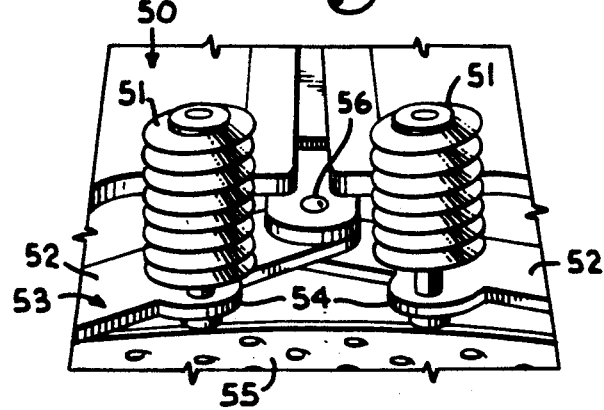

FRUIT AND VEGETABLE PEELER

FIELD OF THE INVENTION

The present invention relates to food processing apparatus and, more particularly, to a surface abrading apparatus including tong mounted graters and a motor to spin a vegetable between the graters.

BACKGROUND OF THE INVENTION

The skins, rinds, or outer surfaces of many fruits and vegetables are often removed prior to consumption thereof. Although the skins of many fruits and vegetables are particularly nutritious, others are tough, bitter, indigestible, or otherwise undesirable. When only a few such fruits or vegetables are to be consumed, as by a family or an individual, hand paring using a knife or other simple tool is generally the most practical approach. Industrial food processing companies generally develop automatic machinery for removing undesired portions of fruits and vegetables in the most efficient and least wasteful manner. Falling in between large scale food processors and individual families are food preparation facilities such as restaurants, schools, nursing homes, hospitals, and the like which cannot justify the type of machinery used by the food processing industries but still require methods more efficient than those suitable for the home.

Beta carotene, which is converted to vitamin A in the body, is often used in the treatment of cancer patients and is found in many dark green vegetables and yellow vegetables such as carrots. Carrots are often preferred for such treatments because of the concentration of beta carotene therein and because they can be pureed to form carrot juice which is easily consumed. Often, the outer layer or "peel" of carrots is removed to improve the taste and appearance of carrots to be eaten raw or cooked or to be prepared as carrot juice. Peeling a great number of carrots manually using conventional knives or graters is very time consuming and often wasteful.

SUMMARY OF THE INVENTION

The present invention provides a vegetable and fruit peeler apparatus for removing an outer layer of an elongated article of food and is particularly well adapted for such processing of carrots. The apparatus includes a base plate on which a tong assembly is mounted in slidable guides. The base plate has a food article receiving aperture formed therethrough. The tong assembly includes a pair of scissor links including manual grips which and connected to end links to form a rhomboid tong section with lateral pivot joints. The tong assembly members are arranged so that the lateral joints are moved together and apart as the grips are similarly moved together and apart. Flexible grater plates are resiliently connected across the lateral joints in mutually facing relation. The tong assembly is positioned so that the grater plates are positioned below the aperture in the base plate. The preferred grater plates have regular patterns of individual grater elements thereon, and the grater plates are positioned in a staggered relationship to provide a denser effective patter of the individual grater elements.

The base plate of the apparatus is provided with feet to engage the sides of a collection container on which the plate is positioned during use. The container is placed on a platform supporting a motor guide standard. A rotary motor is mounted on a slide member which engages the guide standard and which aligns the motor with the aperture in the base plate. The motor includes a prong type of chuck for engaging the food article. The food article is rotated or spun by the motor to grind the surface of the article against the grater plates as the tong grips are brought together and the motor lowered. The container receives shavings from the food article and may also receive the processed article. The amount of surface material removed can be controlled by varying the force of engagement of the grater plates with the food article, by varying the grip force on the tong grips, and by varying the vertical speed with which the article is moved past the grater plates.

In a modified embodiment of the invention, the tongs are provided with sets of freewheeling feed augers or worms mounted on the tong links above the grater plates. The augers act in the manner of screw threads on the food article such that the spinning article is automatically drawn into engagement with the grater plates in reaction to engagement with the augers. In a further modification, the augers may be rotated by a motor to impart controlled feeding movement to the food article and, additionally, rotation of the article for grinding the surface layer against the grater plates.

OBJECTS OF THE INVENTION

The principal objects of the present invention are: to provide an improved apparatus for surface treatment of elongated vegetables and fruits; to provide, particularly, an improved apparatus for surface paring carrots; to provide such an apparatus which is adapted for surface treatment of vegetables of various sizes; to provide such an apparatus which removes only a shallow external layer of the vegetable to minimize waste thereof; to provide such an apparatus including manually operated tongs having resilient grater plates thereon; to provide such an apparatus in which the tongs are mounted on a base plate in sliding guides to facilitate use of the apparatus; to provide such an apparatus including a rotary motor with a pronged chuck to engage and spin a vegetable between the grater plates; to provide such an apparatus including a vertical guide for the motor to increase the accuracy of surface treatment using the motor; to provide an alternative embodiment of such an apparatus to provide such an apparatus including a plurality of freewheeling feed augers or worms which automatically feed the spinning vegetable between the grater plates; to provide such an apparatus including feet mounted on the base plate which are positioned to engage the sides of a container which receives the surface treated vegetable and shavings therefrom to thereby neaten use of the apparatus; to provide such an apparatus which may be conveniently cleaned after use; to provide such an apparatus which is safe in use; and to provide such a vegetable and fruit peeler which is economical to manufacture, convenient and efficient use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective of a vegetable and fruit peeler apparatus embodying the present invention.

FIG. 2 is an enlarged fragmentary top plan view the peeler apparatus.

FIG. 3 is a transverse sectional of the peeler apparatus taken on line 3—3 of FIG. 2.

FIG. 4 is an enlarged bottom plan view of the peeler apparatus with a tong assembly and grater plates thereon shown in a converged configuration.

FIG. 5 is a further enlarged transverse sectional view taken on line 5—5 of FIG. 2 and illustrates details of sliding guides of the tong assembly.

FIG. 6 is a greatly enlarged elevational view showing details of a grater plate of the peeler apparatus.

FIG. 7 is a greatly enlarged fragmentary perspective view of a modified embodiment of the peeler apparatus which incorporates freewheeling feed augers mounted on members of the tong assembly.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a vegetable and fruit peeler apparatus embodying the present invention. The apparatus 1 generally includes a tong assembly 2 with a pair of grater plates 3 mounted thereon in spaced apart relation for movement together when the tong assembly 2 is closed and a rotary motor 4 engaging a food article 5 and aligned with the grater plates 3 to spin the food article 5 to grind it against the grater plates 3 to remove a surface layer thereof. The apparatus 1 preferably includes a support structure 6 for the tong assembly 2 and a motor guide 7 which cooperate to facilitate use of the apparatus 1.

The apparatus 1 is particularly useful to remove a surface layer from a food article 5, such as a skin, peel, rind or the like. The term "food article" is used herein to indicate an article of food, such as a vegetable or fruit, and is not intended to indicate a manufactured food product. The apparatus 1 is particularly well adapted for removing an outer surface layer of carrots; however, it may also be used for similar processing of other food articles, particular elongated and substantially cylindrical types of vegetables and fruits. Therefore, the present invention is not intended to be used strictly with carrots, but has other applications as well.

The illustrated support structure 6 includes a rectangular support plate 10 having a food article receiving aperture 11 formed therethrough. The plate 10 is preferably transparent to allow visual monitoring of the use of the apparatus and may be formed of a transparent plastic. The aperture 11 should be somewhat larger than the diameter of the largest food article 5 with which the apparatus 1 is to be used. The support plate 10 has the tong assembly 2 mounted thereon, as will be detailed below. The support structure 6 may include a collection container 12 having side walls 13. The support plate 10 has legs 14 mounted thereon and positioned in a rectangular pattern to engage the side walls 13 of the container 12 to steady the position of the plate 10. The legs 14 may be formed of elongated bolts fastened by sets of nuts 15 to the plate 10. The legs 14 may be provided with washers 16 to engage an upper rim 17 of the container 12.

The illustrated tong assembly 2 includes a pair of proximal scissor links 20 and a pair of distal links 21. The proximal links 20 have manual grips 22 formed thereon at proximal ends 23 thereof and are crossed and pivotally connected by a bolt 24 forming a first center joint. The distal links 21 are pivotally connected by a bolt 25 forming a second center joint. Distal ends 26 of the proximal links 20 are connected to the distal links 21 by bolts 27 forming lateral pivot joints. Portions of the links 20 and 21 between the center joints 24 and 25 and the lateral joints 27 are equal in length and form a rhomboid linkage 28.

The support plate 10 is provided with aligned guide slots 31 which slidably receive extensions of the bolts 24 and 25. The lateral joints 27 have guide bars 32 pivotally connected thereto and received in guide tracks 33 which are mounted on the underside of the plate 10 on opposite sides of the aperture 11. The slots 31 and tracks 33 provide a means for mounting the tong assembly 2 on the underside of the plate 10 and for constraining the extent of motion of members of the tong assembly.

The illustrated grater plates 3 are flexibly resilient and are formed of sheet stock with a pattern of perforations formed therethrough and with edges of the perforations bent out past the surface of the sheet stock to form a two dimensional pattern of individual grater elements 37. The grater plates 3 are mounted across and inwardly of the lateral joints 27 of the tong assembly 2. Referring to FIG. 6, one end of each grater plate 3 is connected to an L-shaped bracket 36 which is then connected to one of the links of the tong assembly 2. As shown in FIG. 4, one grater plate 3 is connected to a proximal link 20 on one side of the tong assembly 2 and to a distal link 21 on the opposite side thereof. The opposite ends of the grater plates 3 are connected respectively to extensions of the center joint bolts 24 and 25 by springs 38. The use of the springs 38 and the inherent resilience of the grater plates 3 allow the plates to conform, to a great extent, to the shape of the food article 5 which is being processed by the apparatus 1. Additionally, the resilient force of the springs 38 urges the linkage 28 toward an open configuration.

In order to increase the effective density of the individual grater elements 37, the grater plates 3 are preferably positioned in a staggered relation. This is illustrated in FIG. 5 wherein the grater plate 3 on the left (as viewed) is positioned lower than the one on the right. This misaligns the individual grater elements 37 on the plates 3 to provide for finer abrasion of the surface of the food article 5.

The collection container 12 is preferably positioned on a base platform 41 having a motor guide standard 42 upstanding therefrom. A motor guide bracket 43 is received on the standard 42 and is slidable therealong. The motor 4 is mounted on the bracket 43 and aligned with the aperture 11 in the support plate 10 by positioning the container 12 therebelow. The motor 4 has a pronged chuck 44 on a motor shaft thereof on which the food article 5 is removably impaled. The motor 4 need not have a particularly high torque or rotational speed rating since its use in the present invention does not require heavy duty performance.

In using the apparatus 1, a food article 5, such as a carrot, is preliminarily cleaned and, if necessary, trimmed and impaled on the pronged chuck 44 of the motor 4. The motor 4 is activated to spin the food article 5. The motor guide bracket 43 is lowered between the grater plates 3 as the tong grips 22 are converged to engage the grater plates 3 with an outer surface of the food article 5. Spinning engagement of the outer surface of the food article 5 with the grater plates 3 causes the outer surface layer to be ground away with the shavings being collected in the container 12.

When the top end of the food article 5 has been abrated, the motor 4 may be deactivated and the bracket 43 raised to remove the article 5 from the chuck 44. The apparatus 1 is now ready for processing the next article 5. Usually, only a single pass of an article 5 through the apparatus 1 is required. If a food article 5 is particularly irregular, a slower pass with greater closing force on the grips 22 of the tong assembly 2 may be required for satisfactory results. Deeper blemishes, such as gashes or the like, may require subsequent hand paring. However, the majority of the effort in surface paring food articles 5 is accomplished very quickly and with a minimum waste of the food material.

FIG. 7 illustrates a modified embodiment of the peeler apparatus of the present invention. The modified apparatus 50 is substantially similar to the apparatus 1 except for the addition of freewheeling feed augers 51. The augers or worms 51 are rotatably mounted on link members 52 of a tong assembly 53 which is substantially similar to the tong assembly 2. The link members 52 may be provided with ears 54 to properly position the augers 51 in relation to grater plates 55 of the apparatus 50. A pair of augers 51 is located adjacent each of a pair of lateral joints 56 of the tong apparatus 53. The purpose of the augers 51 is to provide an automatic feeding mechanism for a spinning food article by engagement of the article with the augers 51 which act in the manner of tapped screw threads. The illustrated augers 51 are positioned above the tong assembly 53; however, additional augers may be provided below the grater plates 55 to draw the spinning food article entirely past the grater plates 55. It is foreseen that the augers 51 could be rotatively driven in unison to act not only as a feed mechanism but also as a spinning mechanism for the food articles. For this purpose, the augers may be serrated or similarly treated for better gripping in the spinning direction.

It is to be understood that while certain forms of the present invention have been illustrated and described herein, it is not to be limited to the specific forms or arrangement of parts described and shown.

What is claimed and desired to be secured by Letters Patent is as follows:

1. A grater apparatus for surface paring an elongated food article and comprising:
   (a) a support plate having a food article receiving aperture formed therethrough;
   (b) tong means including opposite sets of links pivotally connected to form a rhomboid linkage having pivot joints positioned at vertices of said linkage, said joints including a pair of opposing lateral pivot joints;
   (c) said tong means including a pair of manual handles spaced from said lateral joints in such a manner that movement of said handles together causes movement of said lateral joints together;
   (d) slidable guide means connecting said joints to said support plate and positioning said lateral joints to enable same to move through said aperture of said support plate;
   (e) a pair of grater plates mounted on said tong means respectively inwardly of said lateral joints in mutually facing relation to enable movement of said abrasion means upon movement of said lateral joints; and
   (f) a base platform;
   (g) a collection container positioned on said platform and having said support plate positioned thereon;
   (h) an elongated motor guide standard upstanding from said platform;
   (i) a motor guide bracket positioned on said standard and slidable therealong; and
   (j) rotary motor means connected to said bracket and positioned in alignment with said aperture, said motor means being adapted for engagement with said food article to grind same between said grater plates to thereby pare a food surface of said food article.

2. An apparatus as set forth in claim 1 wherein said linkage includes:
   (a) a pair of proximal scissor links having said handles thereon; and
   (b) a pair of distal links pivotally connected respectively to said proximal links at said lateral joints.

3. An apparatus as set forth in claim 2 wherein:
   (a) each of said grater plates is connected across a respective one of said lateral joints to a connected set of a proximal link and a distal link.

4. An apparatus as set forth in claim 2 wherein:
   (a) each of said grater plates is resiliently connected across a respective on of said lateral joints to a connected set of a proximal link and a distal link.

5. An apparatus as set forth in claim 2 and including:
   (a) a freewheeling auger rotatably mounted on each of said proximal links and said distal links adjacent said grater plates, the feed augers cooperating to engage said spinning food article and feed same into grinding engagement with said grater plates.

6. An apparatus as set forth in claim 1 wherein:
   (a) each of said grater plates includes discrete grater elements positioned in a regular two dimensional pattern; and
   (b) said grater plates are positioned in staggered relation on said tong means in such a manner as to misalign individual grater elements on said grater plates to thereby provide a denser effective pattern of said grater elements.

7. An apparatus as set forth in claim 1 wherein:
   (a) said grater plates are resiliently flexible.

8. A grater apparatus for surface paring a food article and comprising:
   (a) tong means including a pair of pivotally connected tong levers, each lever having manual grip means at a proximal end and having a distal end;
   (b) means forming a food article abrasion surface toward said distal end of at least one of said tong levers, said abrasion surface being oriented to receive and abrasively engage said food article upon closing movement of said tong levers by manual movement of the grip means of said levers together, whereby upon rotation of said food article, a food surface of said food article is pared;

(c) said means forming said abrasion surface includes a resilient, flexible grater plate connected to said distal end of each of said tong levers;

(d) the grater plates are oriented on said distal ends in mutually facing relation;

(e) each of said grater plates includes individual grater elements positioned in a regular two dimensional pattern; and (f) said grater plates are staggered on said distal ends of said tong levers in such a manner as to misalign individual grater elements on said grater plates to thereby provide a denser effective pattern of said grater elements.

9. A grater apparatus for surface paring an elongated food article and comprising:

(a) frame means;

(b) tong means pivotally mounted on said frame means and including opposite, pivotally connected links;

(c) a pair of grater plates connected respectively to said links of said tong means, said plates being positioned in substantially opposing parallel relation to receive and engage said food article therebetween in cooperation with said tong means;

(d) rotary motor means positioned in alignment with said plates, said motor means being adapted to engage said food article to spin same and thereby grind same against said grater plates to pare a food surface of said food article;

(e) a support plate having a food article receiving aperture formed therethrough; and (f) slidable guide means connecting said tong means to said support plate to position said grater plates on opposite sides of said aperture.

10. An apparatus as set forth in claim 9 wherein:

(a) each of said grater plates is resiliently connected to a respective one of said links of said tong means.

11. An apparatus as set forth in claim 9 and including:

(a) motor guide means having said motor means mounted thereon in substantial alignment with said grater plates; and (b) chuck means on said motor means which is adapted for removably engaging said food article to spin same.

12. An apparatus as set forth in claim 11 and including:

(a) a platform;

(b) a motor guide standard forming said motor guide means projecting upwardly from said platform;

(c) a motor guide bracket slidably received on said standard and having said motor means connected thereto;

(d) a collection container having side walls positioned on said platform; and (e) a set of feet mounted on said frame means to engage said side walls of said container to thereby position said frame means on said container below said motor means.

13. An apparatus as set forth in claim 9 wherein:

(a) said grater plates are resiliently flexible.

14. A grater apparatus for surface paring an elongated food article and comprising:

(a) frame means;

(b) tong means pivotally mounted on said frame means and including opposite, pivotally connected links;

(c) a pair of grater plates connected respectively to said links of said tong means, said plates being positioned in substantially opposing parallel relation to receive and engage said food article therebetween in cooperation with said tong means;

(d) rotary motor means positioned in alignment with said plates, said motor means being adapted to engage said food article to spin same and thereby grind same against said grater plates to pare a food surface of said food article;

(e) each of said grater plates includes discrete grater elements positioned in a regular two dimensional pattern; and (f) said grater plates are staggered on said distal ends of said tong levers in such a manner as to misalign individual grater elements on said grater plates to thereby provide a denser effective pattern of said grater elements.

15. A grater apparatus for surface paring an elongated food article and comprising:

(a) frame means;

(b) tong means pivotally mounted on said frame means and including opposite, pivotally connected links;

(c) a pair of grater plates connected respectively to said links of said tong means, said plates being positioned in substantially opposing parallel relation to receive and engage said food article therebetween in cooperation with said tong means;

(d) rotary motor means positioned in alignment with said plates, said motor means being adapted to engage said food article to spin same and thereby grind same against said grater plates to pare a food surface of said food article;

(e) said links of said tong means are proximal scissor links;

(f) a pair of distal links are pivotally connected respectively to said proximal links at lateral joints therebetween; and (g) each of said grater plates is connected across a respective one of said lateral joints to a connected set of a proximal link and a distal link.

* * * * *